Figure 1:
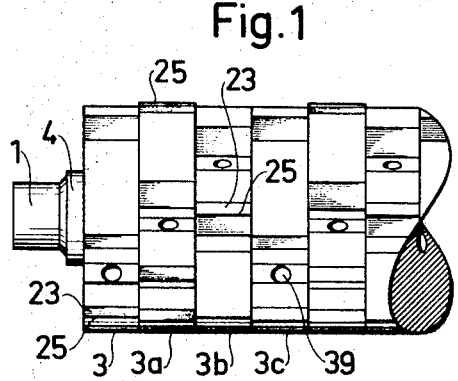

United States Patent

[11] 3,587,151

| [72] | Inventor | Kjell Signar Nystrom<br>Pitea, Sweden |
|---|---|---|
| [21] | Appl. No. | 812,106 |
| [22] | Filed | Apr. 1, 1969 |
| [45] | Patented | June 28, 1971 |
| [73] | Assignee | Sevenska Industrietableringsaktieblaget |
| [32] | Priority | Apr. 3, 1968 |
| [33] | | Sweden |
| [31] | | 4390/68 |

[54] ROTARY CUTTER WITH INSERTABLE CUTTING ELEMENTS AND CUTTING ELEMENT FOR USE THEREIN
19 Claims, 6 Drawing Figs.

| [52] | U.S. Cl. | 29/105 |
|---|---|---|
| [51] | Int. Cl. | B26d 1/12 |
| [50] | Field of Search | 29/96, 97, 98, 103, 104, 105, 105.1 |

[56] References Cited
UNITED STATES PATENTS

| 417,776 | 12/1889 | Eynon | 29/105 |
|---|---|---|---|
| 947,319 | 1/1910 | Wells | 29/105 |
| 1,109,321 | 9/1914 | Charles | 29/105X |
| 1,194,865 | 8/1916 | Muller | 29/105 |
| 1,432,580 | 10/1922 | Vauclain | 29/105 |
| 1,941,790 | 1/1934 | Davis | 29/104X |
| 1,948,648 | 2/1934 | Buchmuller | 29/105 |
| 2,362,708 | 11/1944 | Markstrum | 29/105 |

FOREIGN PATENTS

| 1,124,730 | 8/1968 | Great Britain | 29/105 |
|---|---|---|---|
| 318,815 | 2/1920 | Germany | 29/105 |
| 1,050,681 | 9/1953 | France | 29/105 |

*Primary Examiner*—Harrison L. Hinson
*Attorney*—Fred C. Philpitt

ABSTRACT: The present invention relates to a rotary cutter for the working of comparatively soft materials such as wood, board, plastics etc. More specifically the invention relates to a rotary cutter with insertable cutting elements which are arranged at the periphery of the cutter, the cutting edges of the cutting elements extending parallel or substantially parallel with the axis of rotation of the cutter.

PATENTED JUN28 1971 3,587,151

ROTARY CUTTER WITH INSERTABLE CUTTING ELEMENTS AND CUTTING ELEMENT FOR USE THEREIN

It is known to use such rotary cutters for plaining or plain cutting of a workpiece, the cutters being generally of the type in which each cutting element extends along the entire length of the rotary cutter, this length being at least equal to the breadth of the object to be worked. There are certain inconveniences in connection with the use of rotary cutters of this known type. One is that the operations required for setting and fixing the cutting elements in the cutter are difficult and time-consuming since it requires a high degree of exactness and measurement for checking that the cutting edges of all cutting elements are located in one and the same cylindrical surface in order that all cutting elements shall contribute to the working of the article to be treated. The accurate setting of the cutting elements and the checking measurements must be repeated each time a cutting element is substituted. Another inconvenience resides in the fact that when a cutting element has been damaged even to a limited degree, for instance by a small object such as a nail in the workpiece, the whole cutting element having a length equal to that of the rotary cutter must be substituted or remilled whereafter the aforementioned difficult procedure for setting, checking measurement etc. must be repeated. Still another drawback of the known cutters of this type is that the cutter exerts a heavy striking or beating action upon the workpiece as the cutting elements come into contact with the latter, since the engagement between the cutting element and the workpiece extends along the entire length of the cutter.

It has been proposed to avoid one or more of the abovementioned inconveniences by dividing the rotary cutter and/or the cutting elements into sections having a limited extension in the direction of the axis of the cutter, it being then only necessary to substitute a cutting element in the section where the damage has occurred, and by setting the sections differently in the circumferential direction of the cutter so that engagement between a cutting element and the workpiece does not occur simultaneously along the entire length of the cutter. For the practical applicability of this method a very high degree of accuracy is required when setting and fixing the cutting elements in the rotary cutter so that the cutting elements occupy exactly the right position mutually and relative to the rotary cutter, since otherwise the worked surface of the workpiece will not become quite plain but will show recessed and raised portions corresponding to different working depths of different cutting elements of the sections.

Conventional methods for setting and fixing cutting elements in rotary cutters do not easily comply with the abovementioned high requirements as to the accuracy of the cutting element mounting. For this reason known rotary cutters composed of several sections have not found extensive practical use.

The main object of the present invention is to provide a rotary cutter and a cutting element thereto which make it possible to set and fix the cutting element quickly in such a manner that the cutting edge of the cutting element immediately comes into exactly the right position so that after-adjustment and checking measurements are not required. This makes it possible to provide a rotary cutter with any desired length composed of several sections or cutting units, such rotary cutter being especially suitable for plain cutting of an article to be worked. The cutting elements according to the invention are very simple and can be produced at low costs. Further advantages with the invention will appear from the following description.

A rotary cutter according to the invention comprises one or more rotatable cutting units provided with cutting elements, the cutting edges of which extend parallel or substantially parallel with the axis of rotation of the rotary cutter, and is characterized in that the cutting unit is provided near the periphery thereof with two abutments fixed relatively to the body of the cutter unit, the cutter body, and forming therebetween a space, such as a slot, for accommodating and fixing the cutting element at a portion thereof, adjacent to the cutting edge of the cutting element.

Said abutments are integral with or are permanently and rigidly connected to the cutter body and are rigid, i.e. not resilient or adjustable. Owing to this feature small dimensional differences between various cutting elements corresponding to manufacturing tolerances will have minimum influence as to the position of the cutting edge of the cutting element as one cutting element is substituted for another cutting element in the rotary cutter.

A further essential characteristic of the invention is that the cutting element is turnable or rotatable to some extent about an axis which is parallel with or substantially parallel with the axis of the cutter body for setting the cutting element into its fixed position between said two abutments. The axis about which the cutting element is turnable is located at such a distance from the centerline of the axis of rotation of the cutter body that a slight rotational movement of the cutter element to or from its fixed position between said abutments will cause a very slight and neglectable movement of the cutting edge of said element in the radial direction with respect to the axis of rotation of the cutter body. Owing to this feature different cutting elements with slight dimensional differences caused during the manufacture thereof will, after movement of the cutting element to its fixed position between said abutments, be fixed with their cutting edges in positions which practically do not differ from each other in the radial direction with respect to the axis of the cutter. In other words, different cutting elements fixed between said rigid abutments will have accurately equal working depths and no after-adjustment of the cutting elements after the fixing thereof will be necessary. Besides, such adjustment is not possible after the fixing of the cutting element.

The cutter body is formed with a rigid seat for the cutting element which seat can be of a shape such that it forms part of a circularly cylindrical surface the central axis of which coinciding with the axis about which the cutting element is turnable. Alternatively or in addition thereto the cutting element may be formed with a circularly cylindrical surface adapted to be received in said set. In a suitable embodiment of the cutting element according to the invention the cross section of the cutting element taken perpendicularly to the axis of rotation of the cutter has the shape of a segment of a circle.

A further characteristic feature of the invention is that the cutter units in a rotary cutter consisting of several cutter units are formed at the periphery thereof with outwardly open recesses extending along the entire axial length of the cutter unit, each of which recesses being situated opposite a cutting element of an adjacent cutter unit in the assembled rotary cutter. This makes it possible to change or substitute cutting elements by moving the cutting element in the direction of the axis of the cutting unit into such a recess of an adjacent cutting unit.

Figure 2:
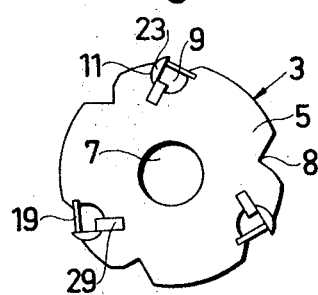
Figure 3:
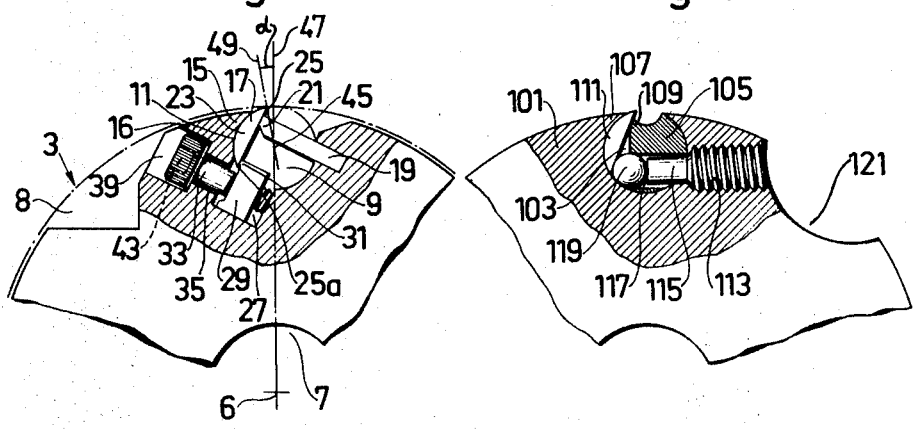
Figure 4:
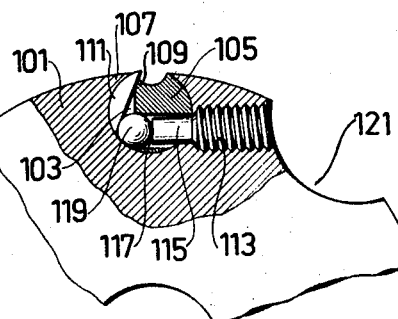
Figure 5:
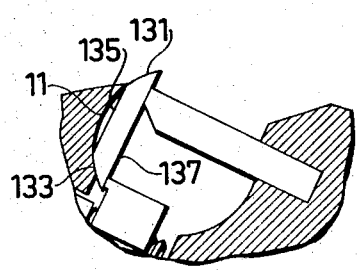
Figure 6:
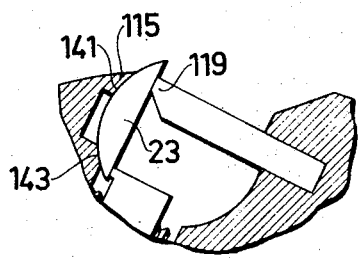

The invention will be more fully described hereinbelow with reference to the accompanying drawing in which FIG. 1 is a side view of a rotary cutter according to the invention composed of several cutting units, FIG. 2 is an end view of a cutting unit for a cutter according to FIG. 1, FIG. 3 is an end view of a portion of the cutting unit according to FIG. 2 shown in an enlarged scale relative to FIG. 2 and partly in section perpendicular to the axis of rotation of the cutting unit, FIG. 4 illustrates in the same manner as FIG. 3 a portion of a cutting unit according to an alternative embodiment of the invention and FIG. 5 and 6 are simplified end views of two alternative embodiments of cutting elements according to the invention and the adjacent portions of the cutter unit carrying said elements.

The rotary cutter according to FIG. 1 has an axially through-going shaft 1 adapted to be supported in bearings and to be driven in any known manner, not shown. The shaft 1 supports the cutting units 3, 3a, 3b, 3c etc., each comprising a body 5 having a central bore 7. The cutter body 5 may be made of steel or another suitable material. The cutter unit also comprises means for accommodating and fixing cutting elements at the periphery thereof as will be described in more detail hereinbelow. The central bore 7 of the cutter bodies has accurate sliding clearance around the shaft 1 of the rotary cutter. The cutter units are held against rotation about the shaft 1 by clamping between an abutment 4 on the shaft 1 at one end thereof and a nut (not shown) screwed onto the opposite end of the shaft. The clamping pressure between the cutter units caused by tightening said nut is quite sufficient for preventing rotation of the cutter units about the shaft 1.

In the embodiment shown in FIGS. 1—3 each cutter unit is provided with three cutting elements 23 equally distributed circumferentially of the cutter unit. The number of cutting elements can of course be chosen as desired. The cross section of the cutting elements 23 taken perpendicularly to the direction of the shaft 1 has the shape of a segment of a circle, the bent surface of the cutting element being a cylindrical surface. The cutting elements are provided with an outer working edge 25 and a similar inner edge 25a, the cutting elements thus being reversible.

It will be seen from FIG. 1 that adjacent cutter units are set in different angular positions about the shaft 1, the angular difference between the settings of the various cutter units being arranged such that the cutting elements form together one or more stepped helical lines. One advantage with this arrangement is that the cutting elements will come into engagement with the workpiece only one or a few at a time. This results in the strike or beat action occurring at the impact between the cutting elements and the workpiece and consequently the operational vibrations of the rotary cutter being reduced to a minimum. In known rotary cutters comprising cutting elements extending parallel with the axis of the cutter and along the entire length of the cutter such vibrations usually cause high noise and decrease the accuracy of working.

For easily determining the angular setting of the cutter units the latter may be provided at one flat side thereof with a projection (not shown) fitting into a corresponding recess in the opposite flat side of an adjacent cutter unit.

As appears from FIGS. 2 and 3 the cutter body 5 is provided near the periphery thereof with bores 9 for each cutting element said bores extending along the entire length of the cutter body. This results in a circular, cylindrical surface 11 of the bore 9, said surface forming a seat for the cutting element 23 and having the same radius of curvature as the cylindrical surface of the cutting element. A portion 15 of the cutter body 5 defined between the circumferential surface 16 of the cutter body and a part of the seat 11 located near the periphery of the cutter body serves as an abutment or stop for fixing the cutting element. A second abutment or stop 21 is formed by a steel member 19 rigidly secured to the cutter body and suitably serving as a chip breaker. Between said fixed, not adjustable, or resilient, abutments or stops 15 and 21 there exists a space or slot 17 which, as seen in a sectional plane perpendicular to the axis of the cutter body, is wedgelike and narrowing outwardly of the cutter body. For fixing the cutter element 23 the outer portion thereof adjacent to its edge 25 is inserted between said abutments 15 and 21 and urged into contact therewith. The member 19 has substantially the same axial length as the cutter body 5.

It will appear from the foregoing that the cutter element 23 is fixed between two rigid abutments or stops as near as possible to the working edge 25 of the cutter element. Thus, the cutting edge 25 will be accurately fixed in a position which is substantially independent of normal manufacturing tolerances of the cutting element. These tolerances will have mentionable influence only upon the position of the inner edge 25a, and not upon the outer edge 25, since the distance between the outer edge 25 and the abutments 15 and 21 is small as compared with the largest dimension of the cross section of the cutting element, e.g. not greater than one-third of said largest dimension. In the embodiment shown said largest dimension is represented by the distance between the edges 25 and 25a of the cutting element.

For urging the cutter element 23 into engagement with the stops 15 and 21 a pressure bar 29 has been provided which is located in a longitudinal recess 27 with rectangular cross section in the cutter body. The pressure bar 29 has a projecting rim 31 engaging the flat surface of the cutter element 23 at a small distance from the inner edge 25a of the cutter element. A screw 33 extends through a bore 35 in the cutter body 5 and through a threaded bore in the pressure bar 29. The head 43 of the screw is located in a recess 39 in the cutter body and between said recess and the bore 35 there is a shoulder against which the screwhead abuts at the tightening of the screw. Upon tightening of the screw the rim 31 engages the cutter element 23 so that the latter is turned about the axis 45 of the bore 9 while sliding in the seat 11. The turning movement of the cutting element is continued until the portion of the cutting element adjacent to the working edge 25 thereof has been fixed between the rigid stops 15 and 21 in the manner described.

Insertion of the cutting element 23 in the cutter body 5 and removal of the cutting element therefrom is effected by moving the cutting element in the direction of the axis of the cutter body. In order to make this movement possible in a rotary cutter composed of several cutter units as shown in FIG. 1 each cutter body has been formed with recesses 8 at its periphery. In the assembled rotary cutter each of the recesses 8 of a cutter body is situated opposite one cutting element of at least one of the adjacent cutter bodies. When a cutting element shall be removed the pressure bar 29 is usually moved by the screw 23 in a direction away from the cutting element 23 to a greater extent than what is necessary merely for moving the cutting element by hand in the longitudinal direction. This will facilitate the removal of the cutting element, since it provides a certain extra space for an angular movement of the cutting element at the final stage of the removal of the latter, so that the cutting element may be removed even if the axial length thereof is slightly greater than the axial length of the cutter body. This is of importance, since it is desired to provide a certain axial overlap between the cutting elements of adjacent cutter bodies thereby securing that there will be no unworked portions of the workpiece at the borderline between two adjacent cutter units.

In FIG. 3 a plane 47 is indicated containing the centerline 6 of the cutter body 5 and the centerline 45 of the cylindrical surface of the seat 11 for the cutting element. By 49 a plane is indicated containing the centerline 45 and the working edge 25 of the cutting element 23. The angle between the planes 47 and 49 is designated by $\alpha$. This angle $\alpha$ shall, according to the invention, be not greater than about 30°, preferably not greater than about 20° and suitably about 10°. As appears from FIG. 6 a low value of the angle $\alpha$ will result in that a slight rotational movement of the cutting element 23 in its seat 11, i.e. about the axis 45, to or from the fixed position of the cutting element between the abutments 15 and 21 will lead to only a very slight and neglectable movement of the edge 25 of the cutting element in the radial direction with respect to the cutter body. The neglectable movement of the edge 25 in the radial direction has the advantage that there will be practically no effect of the slight but unavoidable dimensionable differences between various cutting elements 23 upon the working depths of the cutting elements after the cutting element has been fixed between the abutments or stops 15 and 21. This is the more true since the fixing of the cutting elements at the portion thereof adjacent to the working edge between two rigid stops already provides for a high degree of accuracy with respect to the position of the working edge 25.

Thus, it will be seen that by tightening the screw 33 for fixing the cutting elements between the stops 15 and 21 the working edge of the cutting element will always be located at an exact predetermined distance from the center axis 6 of the cutter body. This distance will be accurately equal in all cutter units of which the composite rotary cutter consists. This is, however, conditional upon the precision with which the cutter body with its rigid abutments or stops 15 and 21 has been manufactured, but the required precision of manufacture does not exceed what is possible in ordinary tool manufacturing plants.

In FIG. 4 a modification of the cutter unit according to FIGS. 2 and 3 is illustrated. The cutter body 101 is provided near the periphery thereof with a bore 103 in which a member 105, suitably serving as a chip breaker, is secured, for instance by brazing, gluing or the like. The cutter body 101 has an abutment or stop 107 near its periphery and the body 105 has an abutment or stop 109 likewise near the periphery of the cutter body. Between these stops 107 and 109 the outmost portion of the cutting element 111 is fixed. The movement of the cutting element for fixing same between said stops is effected by means of a screw 113 extending through a threaded bore in the cutter body, said screw having an end portion 115 extending through a bore 117 in the member 105 and abutting against a ball 119 which in its turn engages against the lower portion of the cutting element 111. A recess 121 confined by a cylindrical surface is provided in the cutter body 101 for facilitating the insertion and removal of cutting elements in adjacent cutting units of a composite rotary cutter in the manner already described above in connection with FIGS. 1-3.

FIG. 5 is an end view of a part of a cutter body corresponding to that according to FIG. 3 but with a modified embodiment of the cutting element. According to FIG. 5 the cross section of the cutting element is not in the form of a segment of a circle but the cutting element consists of a prismatic body having convex surfaces 131 and 133 resting against the cylindrical surface of the seat 11 for the cutting element. Between said convex surfaces 131 and 133 the cutting element is confined between plane surfaces 135 and 137. Though the convex surfaces 131 and 133 have a radius of curvature which is preferably equal to that of the seat 11 this is not always necessary in order that it shall be possible to turn the cutting element in its seat 11 in the manner described in connection with FIG. 3 for fixing the portion of the cutting element adjacent the edge thereof between said two rigid stops 107 and 109.

In the embodiment according to FIG. 6 the cutting element 23 is identical with that according to FIG. 3 as to its shape but the seat for the cutting element does not have the shape of a circular, cylindrical surface but comprises two spaced, preferably concave surface portions 141 and 143 against which the cylindrical surface of the cutting element rests. Also in this embodiment it will be possible to turn the cutting element 26 about the center axis of its cylindrical surface for fixing the cutting element between two rigid stops 115 and 119 integral with or rigidly secured to the cutter body 5 near the periphery thereof. In similar manner as described above in connection with the surfaces 131 and 133 of the cutting element according to FIG. 5 the surfaces 141 and 143 of the seat for the cutting element need not show a radius of curvature which exactly corresponds to the radius of curvature of the cylindrical surface of the cutting element 23, though equal radii of curvature are to be preferred.

The invention provides many advantages beyond those already mentioned above. Since the cutting elements are directly fixed in exactly the right positions merely by tightening a screw and since no after-adjustment or checking measurements are necessary the time during which the cutter must remain stopped for substituting or reversing cutting elements can be reduced to a minimum which is of great importance for the economy of production. Owing to their simple construction the cutting elements need not, and preferably should not, be remilled but can be thrown away after both edges thereof have been used. This is especially the case when the cutting elements or at least the cutting edges thereof are formed of cemented carbide or cutting alloy steel. Since the weight of the cutting elements is low as compared with that of the cutting body and especially if remilling of the cutting elements is not undertaken, the need for checking and readjusting the running balance of the cutter after substitution or reversion of one or more cutting elements is eliminated, which means that the time during which the cutter can be in effective operation can be still increased correspondingly. The running balance of the cutter can be adjusted once for all and can be made so accurate that the operational speed of rotation of the cutter can be increased very considerably as compared with that of conventional cutters which means that production per hour can be increased and the costs of production decreased correspondingly.

Tests have shown that plain cutting with the use of a rotary cutter according to the invention results in a very smooth surface of the workpiece without recessed or raised portions occurring so that after-treatment for improving the finish of said surface will not be necessary.

It may also be mentioned that the various parts and members of which the cutter according to the invention is composed can be manufactured at low costs owing to their simplicity.

The invention is not limited to the embodiments shown and described since said embodiments can be modified in many respects within the scope of the invention. One such modification which may be mentioned is that the cutter body instead of being in the form of an undivided block can be composed of several body portions fixed relative to each other and each carrying one or more of the cutting elements.

I claim:

1. A rotary cutter comprising at least one cutter unit with a predetermined number of cutting elements, the cutting edges thereof extending substantially in a plane containing the centerline of the rotary shaft of said cutter, and means for moving said cutting elements to an intended fixed position thereof, characterized in that each of said cutting elements is kept in said fixed position by having a portion, near its cutting edge, located between and in contact with two abutments arranged at a fixed distance from each other near the periphery of said cutter unit, said moving means being arranged to move said cutting elements outwardly as seen from the interior of said cutter unit, each of said cutting elements being so arranged in the body of said cutter unit that its cutting edge is shifted essentially peripherally of said body when said cutting element is moved by said moving means to said intended fixed position.

2. A rotary cutter comprising a plurality of cutter units arranged on a common shaft at different angles about the axis of rotation of said cutter, each of said cutter units provided with a plurality of insertable cutting elements, the cutting edges of which extend substantially parallel to said axis of rotation, characterized in that the cutter body of said cutter units is provided with recesses at the periphery thereof between said cutting elements, said recesses providing a free space for inserting and removing said cutting elements in a direction substantially parallel with said axis of rotation.

3. A rotary cutter as claimed in claim 1, characterized in that the cutting element is turnable about an axis which is substantially parallel with the axis of rotation of the cutter unit.

4. A rotary cutter as claimed in claim 3, characterized in that the cutting element is adapted to be received in a seat in the cutter body.

5. A rotary cutter as claimed in claim 4, characterized in that said seat is defined by a cylindrical surface.

6. A rotary cutter as claimed in any of the claims 3, characterized in that the angle between a plane containing the centerline of the axis of rotation of the cutter unit and the axis about which the cutting element is turnable, on the one hand, and a plane containing the last-mentioned axis and the working edge of the cutting element, on the other hand, is not greater than about 30°.

7. A rotary cutter as claimed in claim 6, characterized in that said angle is not greater than about 20°.

8. A rotary cutter as claimed in claim 7, characterized in that said angle is about 10°.

9. A rotary cutter as claimed in claim 3, characterized in that the cutting element has a convex, cylindrical surface adapted to be received in a seat provided in the cutter body.

10. A rotary cutter as claimed in claim 9, characterized in that the cross section of the cutting element taken perpendicular to the axis of the cutter has the shape of a segment of a circle.

11. A rotary cutter as claimed in claim 1, characterized in that the cutting element is adapted to be inserted in and removed from the cutter body by movement of said cutting element in a direction parallel with the axis of rotation of the cutter.

12. A rotary cutter as claimed in claim 11, comprising two or more cutter units provided on a common shaft, characterized in that the cutter body of such a cutter unit is provided with recesses at the periphery thereof between the cutting elements, said recesses providing a free space for inserting and removing cutting elements in a direction parallel with the axis of the cutter.

13. A rotary cutter as claimed in claim 1, characterized in that it is composed of several cutter units which are set at different angles about the axis of rotation of the cutter in order that only one or a few cutting elements at a time will come into engagement with the workpiece, the cutting edges of the composite cutter forming together one or more stepped helical lines.

14. A rotary cutter according to claim 1, characterized in that the cutting element is arranged to be set and fixed between said two abutments at the periphery of the cutter body by means of a screw adapted to exert, directly or indirectly, a pressure against a portion of the cutting element located at a distance from the working edge of the cutting element which is considerably greater than the distance between said edge and said abutments between which the portion of the cutting elements adjacent to the cutting edge is fixed.

15. A rotary cutter as claimed in claim 1, characterized in that the distance between the working edge of the cutting element and said abutments is small as compared with the largest dimension of the cross section of the cutting element, e.g. not greater than one third of said largest dimension.

16. A rotary cutter according to claim 14, characterized in that said screw is arranged to exert pressure upon the cutting element via one or more balls.

17. A cutting element for use in a rotary cutter according to claim 1, characterized in that the portion thereof adjacent to the edge of the cutting element, which portion is adapted to be fixed between two rigid abutments of the cutter body is narrowing in a wedgelike manner towards the working edge of the cutting element.

18. A cutting element as claimed in claim 17, characterized in that it is in the shape of a prism one side thereof being a circular, cylindrical surface.

19. A cutting element as claimed in claim 18, characterized in that the cross section thereof has the shape of a segment of a circle.